US005584104A

United States Patent [19]
Stuart

[11] Patent Number: 5,584,104
[45] Date of Patent: Dec. 17, 1996

[54] BUTTON ATTACHMENT DEVICE

[75] Inventor: Gavin C. Stuart, Manly, Australia

[73] Assignee: Centralised Holdings Pty. Ltd., New South Wales, Australia

[21] Appl. No.: 370,113

[22] Filed: Jan. 9, 1995

[30] Foreign Application Priority Data

Jan. 10, 1994 [AU] Australia .................................. PM3306
Jan. 12, 1994 [AU] Australia .................................. PM3319

[51] Int. Cl.$^6$ ....................................................... A44B 1/00
[52] U.S. Cl. ............................ 24/114.7; 24/90.5; 24/104; 24/105
[58] Field of Search .................................. 24/114.7, 104, 24/105, 90.5, 99, 453

[56] References Cited

FOREIGN PATENT DOCUMENTS

0762608  11/1956  United Kingdom .

Primary Examiner—Victor N. Sakran
Attorney, Agent, or Firm—Ladas & Parry

[57] ABSTRACT

A button attachment device (10) is adapted to replace the standard thread known for holding buttons to fabric. Device (10), typically fabricated from molded plastics material comprises one or more spearhead (13) upon a leg (18). To allow for compression of each spearhead (13) upon passage through holes (16) in button (11), a compression recess (15) is provided. Spearheads (13) are adapted to pass through fabric or material (14) by application of pressure in the direction of arrow A in affixing the device (10) to button (11). Once affixed, the tips of each spearhead (13) may be removed by cutting or otherwise being flattened perhaps by application of heat from an iron.

15 Claims, 7 Drawing Sheets

BUTTON ATTACHMENT DEVICE

FIELD OF THE INVENTION

The following invention relates to a device for attaching buttons to fabric.

It is often a frustrating or at least time consuming procedure to replace lost buttons by sewing the same to a shirt, blouse or other garment.

It can be a problem for those with a visual impairment to thread a needle in preparation for sewing a button back on a shirt for example. Furthermore, it is a time consuming practice to pass the needle back and forth numerous times through the holes in the button.

OBJECT OF THE INVENTION

It is the object of the present invention to provide a simple device for attaching a button to a garment.

SUMMARY OF THE INVENTION

There is disclosed herein a fastener for attaching a button to a garment, the fastener comprising:
- a leg adapted to pass through the garment and through a hole in a button to be fixed to the garment,
- a stopper at one end of the leg adapted to engage the garment, and
- retaining means at the other end of the leg and adapted to engage the button.

Preferably, the engagement means comprises a spearhead adapted to pass through the garment and through the hole in the button in one direction only.

Preferably, the stopper comprises a widened portion having a width greater than the width of the hole in a button.

Preferably, the spearhead comprises a recess extending transversely therethrough, said recess being adapted to compress upon passage of the spearhead through the hole in a button.

Preferably, the fastener further comprises a barb or barbs alongside the recess, the barbs being adapted to engage an upper portion of a button.

Preferably, the spearhead(s) is/are threaded.

Preferably, the engagement means comprise a pair of spearheads one forward of the other.

Preferably, the fastener comprises two or more legs integrally connected to said stopper.

Four legs may be provided, each leg having at least one spearhead, each adapted to pass through one of four holes in a button.

There is further disclosed herein a combination of a garment and a button affixed thereto by the fastener as disclosed above.

Preferably, the combination further comprises a locking plate situated upon the button and held in place thereon by the engagement means.

There is further disclosed herein a method of attaching a button to a garment, the method comprising:
- passing the fastener as disclosed above through the garment and through a hole of the button.

Preferably, the method further comprises the step of snipping or otherwise removing a portion of said engagement means.

Alternatively, the method comprises the step of melting or otherwise deforming at least a portion of the engagement means.

BRIEF DESCRIPTION OF THE DRAWINGS

Preferred forms of the present invention will now be described by way of example with reference to the accompanying drawings, wherein.

DETAILED DESCRIPTION OF THE PREFERRED EMBODIMENTS

Figure 1:
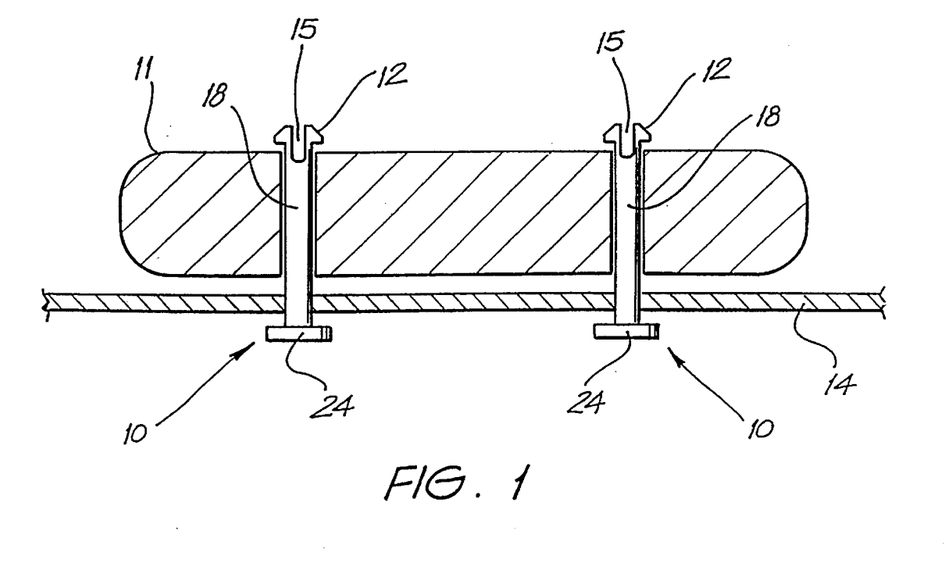
FIG. 1 is a schematic cross-sectional elevational view of a button affixed to a garment by a button attachment device, FIGS. 2(a), (b) and (c) are schematic cross-sectional elevational views of steps taken in affixing a button to a garment using another button attachment device.

In FIG. 1 of the accompanying drawings there is schematically depicted a button 11 upon fabric 14 of a garment. Button 11 is secured to the fabric 14 by way of fasteners 10. Typically, two or four fasteners 10 may be provided.

Each fastener 10 is typically moulded from plastics material and comprises a leg 18 passing through a hole in the button 11. At the base end of each leg a stopper 24 is provided. Stopper 24 is typically a flange having a diameter larger than that of the holes in the button 11. At the upper end of each leg 11 there is provided a pair of jaws 12. Each jaw 12 is also of a width slightly larger than the diameter of each hole in the button 11. Between each jaw there is provided recess 15 in the form of a slot. The jaws 12 are generally biased away from each other as a result of resilience of the material from which the device is made. Such resilience, whether firmly pressing against the holes in the button or not is adapted to prevent the removal of the button from fabric 14 by interaction with the upper surface of the button.

Figure 2A:
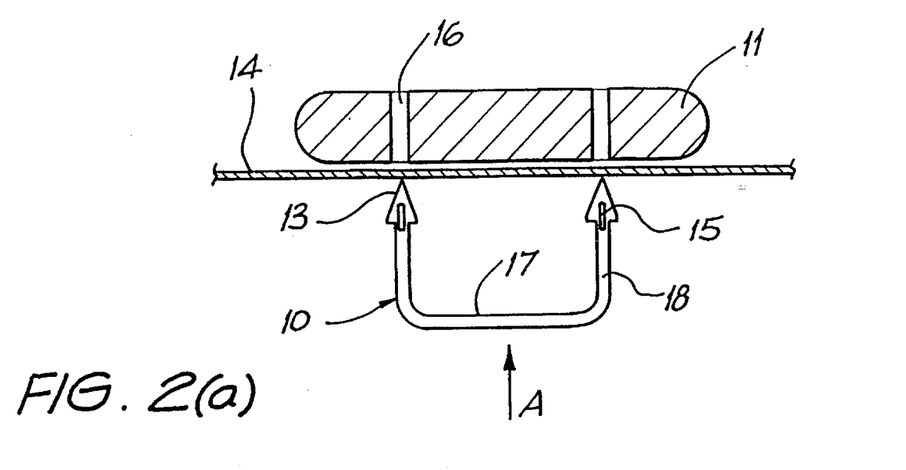

With reference to FIG. 2(a) an alternative embodiment device 10 may be used to affix a button 11 to fabric 14. In this particular embodiment two legs 18 are mutually interconnected by a stopper in the form of a base 17. At the forward end of each leg 18 there is provided a spearhead 13. Each spearhead 13 is provided with a recess 15 in the form of a transverse hole to allow compression of the spearhead upon passage through the hole 16 of button 11. As evident in FIG. 2a, by forming recess 15 as a transverse hole in leg 18, the outer surface of the tip of the spearhead is unbroken and surrounds the transverse hole.

Figure 2B:
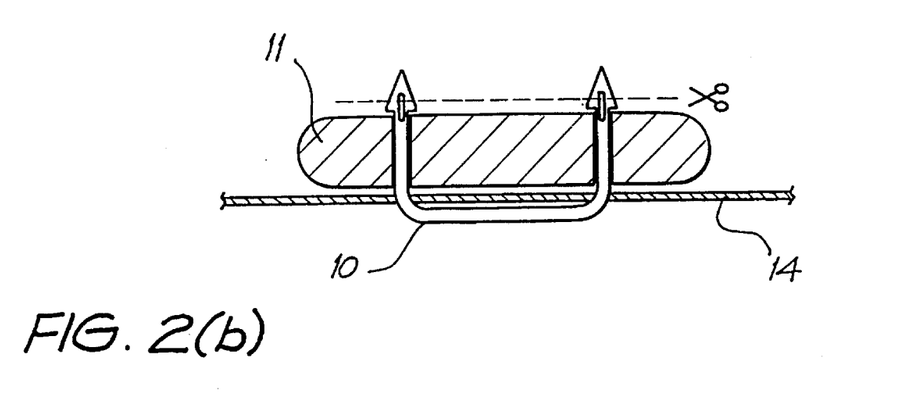
Figure 2C:
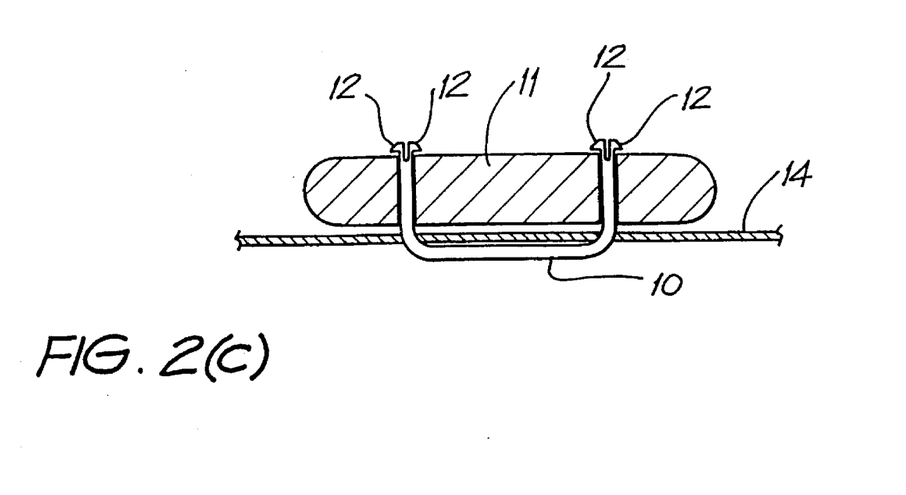

Upon application of force in the direction indicated by arrow A, the device 10 may be used to affix a button 11 to the fabric 14. Each spearhead 13 is simply pushed through the fabric 14 and through each hole 16 in button 11. Recess 15 allows for compression of the spearhead 13 upon passage through holes 16. As shown in FIG. 2(b), the tips of each spearhead 13 may be cut-off using scissors or the like to provide the pair of opposed jaws 12 as shown in FIG. 2(c) similar to those depicted in FIG. 1. To apply force in the direction as indicated by arrow A, thumb pressure may be used. Alternatively, a small pair of pliers or a purpose built instrument may be used.

Attachment of the embodiment of FIG. 1 to a button is similar to that described above with reference to FIG. 2.

Figure 3:
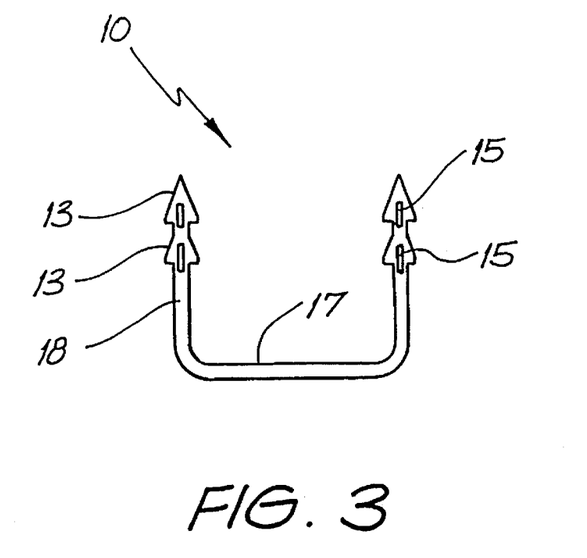
FIG. 3 is a schematic elevational view of an alternative button attachment device.

FIG. 3 depicts a further embodiment of a button fastener. In this embodiment, two spearheads 13 are provided for each leg 18, one forward of another. Each spearhead comprises a compressible recess 15 whose function is similar to that described above. This embodiment allows one to obtain legs 18 of different length suitable for attachment of buttons of a wide variety of thickness to fabrics of a wide variety of thickness. Clearly, more than two heads may be provided upon each leg.

Figure 4:
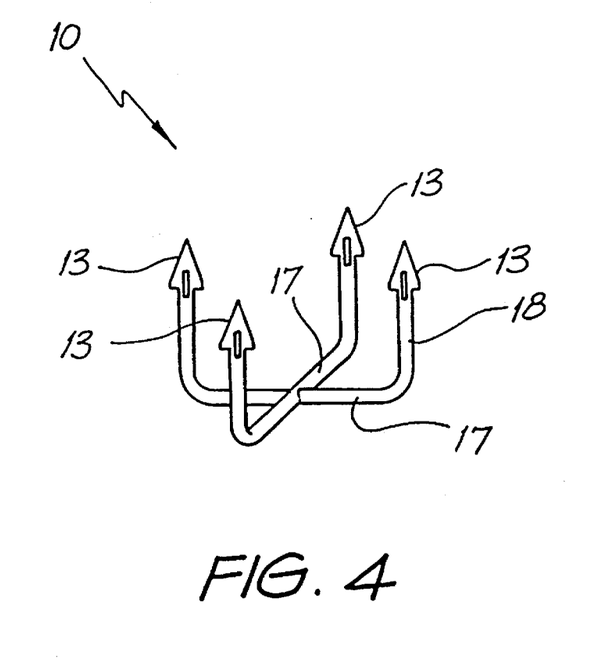
FIG. 4 is a schematic elevational view of an alternative button attachment device, FIGS. 5(a) and (b) are schematic elevational views of alternative button attachment devices, FIGS. 6(a) and (b) are schematic elevational views of yet a further button attachment device in two alternative configurations.

In FIG. 4, four legs 18 are integrally connected by a base 17 comprising a pair of integrally molded through crossing elements. Alternatively, the base 17 might be in the form of a flat disk having legs 18 extending upwardly therefrom. The device comprises four spearheads 13 each adapted to pass through one of four holes in a standard button.

Figure 5A:
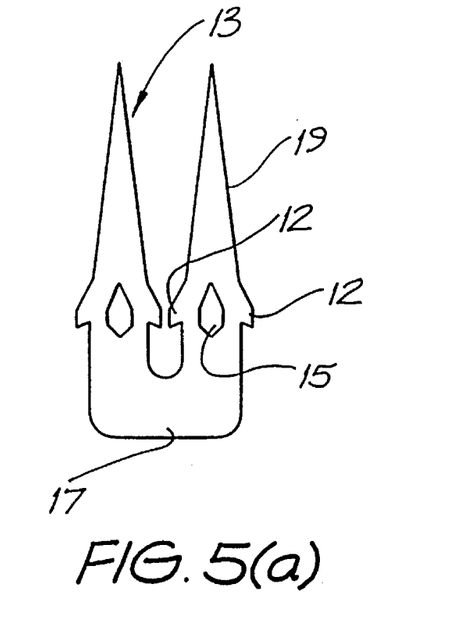
Figure 5B:
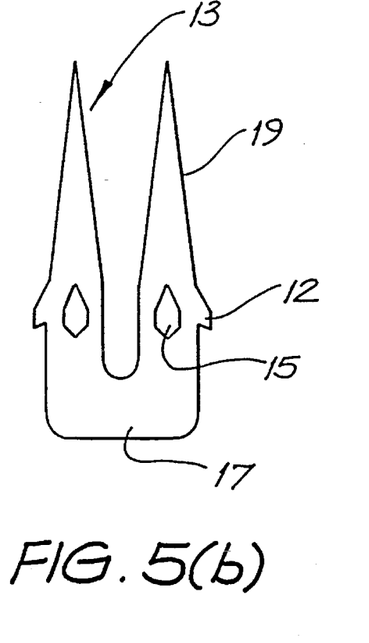

In FIG. 5 there is schematically depicted a pair of alternative embodiment button fasteners. In each embodiment, two spearheads 13 are provided. In the embodiment of FIG. 5(a), a pair of laterally opposed jaws of barbs 12 are provided adjacent to each recess 15. In FIG. 5(b), only one jaw or barb 12 is provided.

Figure 6A:
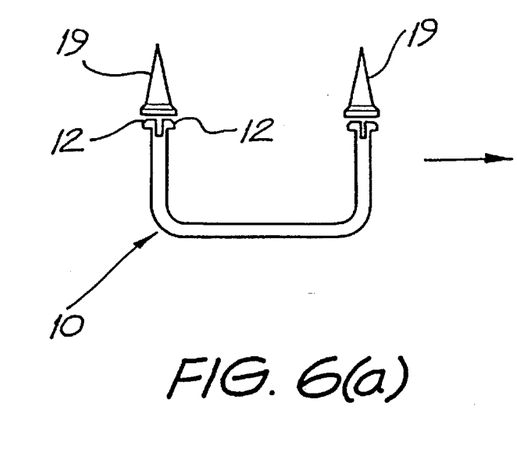
Figure 6B:
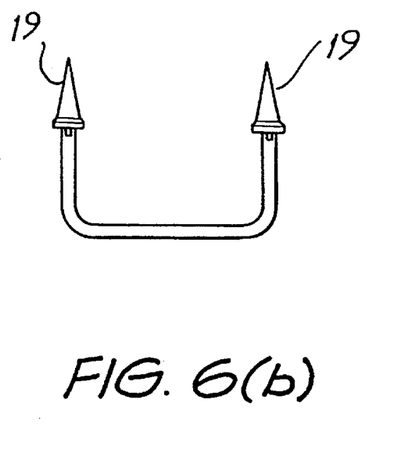

In the device depicted in FIG. 6, the spearhead 19 is provided as a discrete unit. The spearheads 19 might typically be fabricated from steel and adapted for repeated usage. The steel spearheads 19 may be snap engaged by any convenient means to the fastener 10. The maximum diameter of each spearhead (typically fabricated from relatively non-compressible material), should be smaller than the diameter in the holes of the buttons to be attached to a garment.

Figure 7:
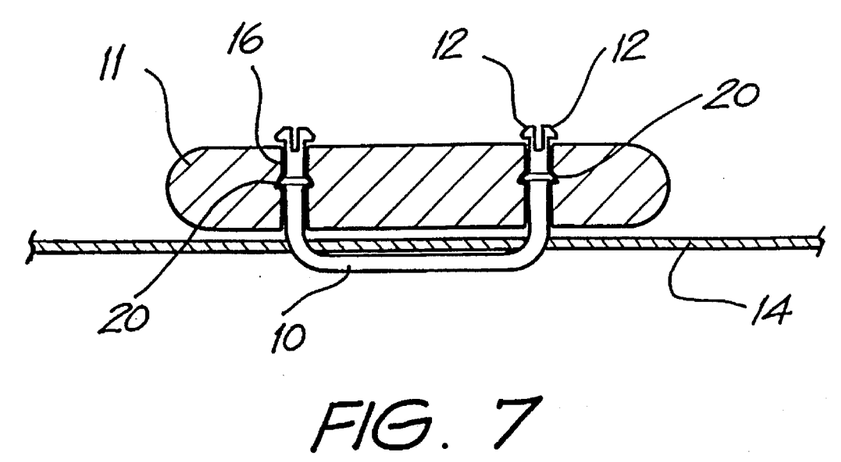
FIG. 7 is a schematic elevational view of a button affixed to a garment by yet another button attachment device.

FIG. 7 depicts a modified button 11. Button 11 is provided with a small annular recess 20 within each hole 16. Each recess 20 is adapted to receive an annular protrusion (also indicated as 20) formed integrally with the legs 18 of a modified fastener 10. For example, the annular protrusion 20 of each leg 18 might be in the form of foldable wings adapted to be biased outwardly into the recess 20. The fastener 10 is otherwise identical to that of FIG. 2. As a further modification to this embodiment, the jaws 12 may be omitted. Therefore, a button having a smooth top surface may be provided as the holes 16 therein need not pass therethrough.

Figure 8:
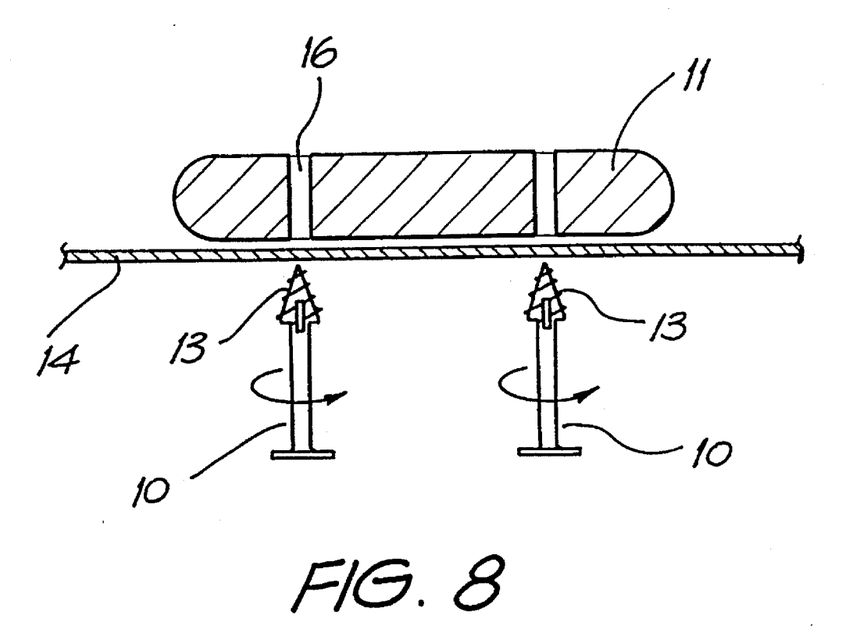
FIG. 8 is a schematic cross-sectional elevational view of a button and two further button attachment devices, FIGS. 9(a) and (b) are schematic cross-sectional views of a button being attached to and as attached to a garment by the attachment device of FIG. 2 or FIG. 4 and also utilising a locking plate, FIGS. 10(a) and (b) are schematic elevational views of a device similar to that of FIG. 2 though adapted to retain a cable or wire against a wall, post, beam or the like, and FIGS. 11(a) and (b) are schematic elevational views showing a device adapted to provide a hook upon a wall, although employing the principles of the present invention.

In FIG. 8 there is depicted a pair of fasteners 10 having screw threads formed upon each spearhead 13. Each fastener 10 may be threadingly engaged with the button 11. The threads are adapted to enhance the penetration of the fastener 10 through the fabric 14 and holes 16 in each button.

Figure 9A:
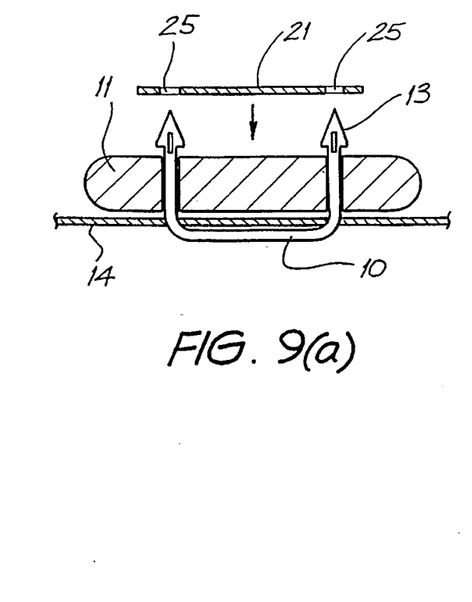
Figure 9B:
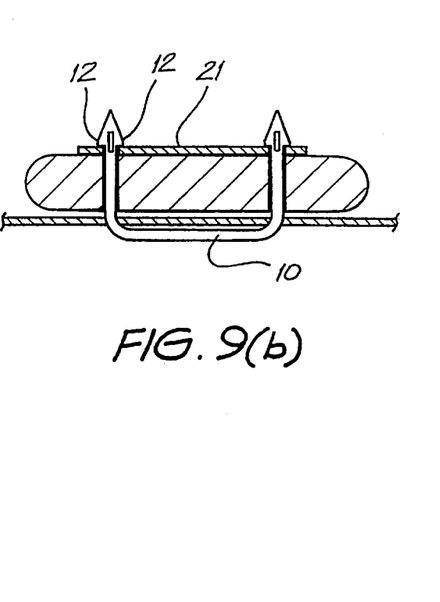

Some buttons may not provide a well defined anchorage surface for engagement with the spearhead 13. To this end, and as depicted in FIG. 9, a locking plate 21 may be provided. Locking plate 21 might be a thin piece of metal or plastic or be fabricated from any other suitably rigid material. The plate 21 may be provided with the required number of apertures 25 through which each spearhead 13 may pass. The plate 21 is adapted to firmly engage the underside of each jaw 12. Plates 21 may be used to enhance the holding strength of the device 10.

It should be appreciated that it is not necessary that the top of the spearheads 13 be removed. For example, when the garment is first ironed, the iron may melt the top of the spearhead to provide a flattened portion. Should the device be formed of plastics material having a higher melting point than the temperature of an iron, some other means of removal of the spear may be necessary such as for example snipping off of the same.

Figure 10A:
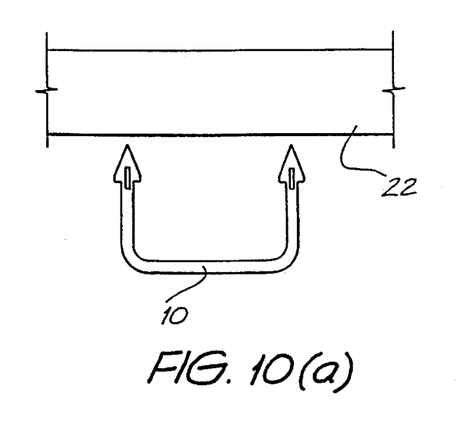
Figure 10B:
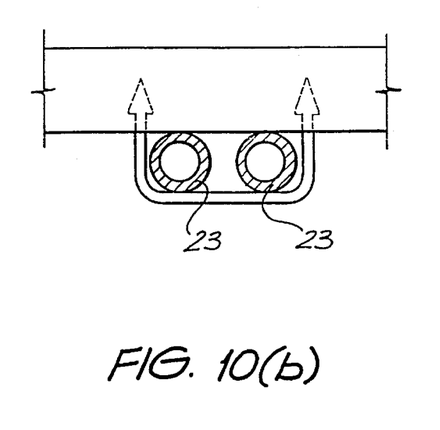

In FIG. 10 there is schematically depicted a device 10 similar to that described above though adapted for an entirely different purpose. The device may be formed of plastics material or a stronger material such as steel. The device 10 may be adapted to secure wires or cables 23 to a wall, joist or the like 22.

Figure 11A:
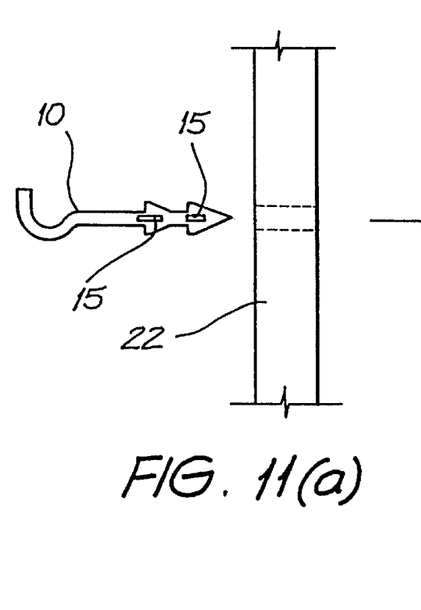
Figure 11B:
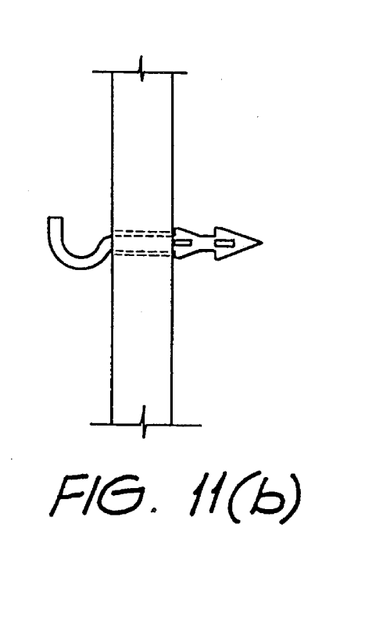

Employing the principles of the invention, a hook as depicted in FIG. 11 may be provided. Hook 10 may be secured to a wall 22 for the purpose of hanging a picture or the like.

With particular reference to FIGS. 1 to 9 of the accompanying drawings, it should be appreciated that modifications and alterations obvious to those skilled in the art are not to be considered as beyond the scope of the present invention. For example, the stoppers 24 may be a circular disk or any other shape. Furthermore, the recesses 15 may be any shape in cross-section such as for example, square, rectangular, circular or otherwise.

Furthermore, although a particular reference has been made to molded plastics material, the fasteners herein might alternatively be fabricated from metallic or other material.

What I claim is:

1. A fastener for attaching a button having two or more holes to a garment, the fastener comprising:

a leg adapted to pass through the garment and then through one of the holes in the button to be fixed to the garment, a stopper at one end of the leg adapted to engage the garment, and a deformable retaining means at the other end of the leg and adapted to pass through said one of said holes in the button and engage the button in position on the garment, said retaining means having a hole extending transversely therethrough to constrict during passage of the deformable retaining means through said one of the holes in the button and after passage through said hole to permanently retain said fastener on said button.

2. The fastener of claim 1 wherein said retaining means comprises one or more barbs adapted to pass through the garment and through the hole in the button in one direction only.

3. The fastener of claim 2 wherein said one or more barbs are adapted to engage an upper portion of the button.

4. The fastener of claim 1 wherein the stopper comprises a widened portion having the width greater than the width of the hole in a button.

5. The fastener of claim 1 wherein the retaining means is threaded.

6. The fastener of claim 1 comprising a second retaining means on said leg, one of said retaining means being forward of the other.

7. The fastener of claim 1 comprising two or more legs integrally connected to said stopper.

8. The fastener of claim 7 comprising four legs, each leg having at least one said retaining means adapted to pass through one of four holes in the button.

9. In combination, a garment and a button affixed thereto by the fastener of claim 1, said leg of said fastener passing through the garment and the hole in the button, said retaining means securing the button on the garment.

10. The combination of claim 9 further comprising a locking plate situated upon the button and held in place thereon by said retaining means.

11. A method of attaching a button to a garment, the method comprising:

passing the retaining means of the fastener of claim 1 through the garment and through a hole of the button.

12. The method of claim 11 further comprising the step of snipping or otherwise removing a portion of said retaining means across said transverse hole after the button is attached to the garment.

13. The method of claim 11 further comprising the step of melting or otherwise deforming at least a portion of the retaining means beyond a section extending across said transverse hole after the button is attached to the garment.

14. The fastener of claim 1, wherein said deformable retaining means has a tapered shape with a base of a transverse width, in an undeformed state, which is greater than the diameter of said one of the holes in the button, said transversely extending hole in said retaining means extending through said retaining means below said base and into said leg, said retaining means being severable above said base to expose said transversely extending hole and form one or more barbs which permanently retain said fastener on said button.

15. The fastener of claim 14, wherein said shape of the retaining means is a spearhead.

* * * * *